US010303650B2

(12) United States Patent
Pudipeddi et al.

(10) Patent No.: US 10,303,650 B2
(45) Date of Patent: *May 28, 2019

(54) CONTIGUOUS FILE ALLOCATION IN AN EXTENSIBLE FILE SYSTEM

(71) Applicant: Microsoft Technology Licensing, LLC, Redmond, WA (US)

(72) Inventors: Ravisankar V. Pudipeddi, Redmond, WA (US); Vishal V. Ghotge, Seattle, WA (US); Ravinder S. Thind, Sammamish, WA (US); David A. Goebel, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/411,376

(22) Filed: Jan. 20, 2017

(65) Prior Publication Data
US 2017/0132218 A1 May 11, 2017

Related U.S. Application Data

(60) Continuation of application No. 14/099,307, filed on Dec. 6, 2013, now Pat. No. 9,575,972, which is a (Continued)

(51) Int. Cl.
*G06F 16/00* (2019.01)
*G06F 16/11* (2019.01)
(Continued)

(52) U.S. Cl.
CPC .............. *G06F 16/11* (2019.01); *G06F 16/13* (2019.01); *G06F 16/1727* (2019.01)

(58) Field of Classification Search
CPC ........... G06F 17/3007; G06F 17/30138; G06F 12/0246; G06F 17/30076;
(Continued)

(56) References Cited

U.S. PATENT DOCUMENTS 4,780,821 A  10/1988 Crossley
4,987,531 A   1/1991 Nishikado et al.
(Continued)

FOREIGN PATENT DOCUMENTS

AU  20050229678 A1  7/2006
CN      1477518 A    2/2004
(Continued)

OTHER PUBLICATIONS

"Office Action Issued in Russian Patent Application 2005134810", dated Sep. 11, 2005, 5 Pages.
(Continued)

*Primary Examiner* — Monica M Pyo
(74) *Attorney, Agent, or Firm* — BakerHostetler

(57) ABSTRACT

Disclosed is a method for creating and reading a contiguous file in an extensible file system. During the creation of a file on the storage media, the file system format check the bitmap to determine if there are areas of free space on the media that would permit the storage of the file in a contiguous manner. By storing the file in a contiguous manner the file may later be read without resorting to the file allocation table, because the file itself would not be fragmented on the storage media. Once an area of free space has been identified, the file is written to the media in a contiguous manner. Further, an associated entry for the file in the directory entry is updated or created to indicate that the file is a contiguous file and also provides basic parameters necessary to read the file without resorting to accessing the file allocation table.

12 Claims, 9 Drawing Sheets

Related U.S. Application Data division of application No. 12/389,391, filed on Feb. 20, 2009, now Pat. No. 8,606,830, and a continuation-in-part of application No. 11/752,872, filed on May 23, 2007, now Pat. No. 7,873,596, said application No. 12/389,391 is a continuation-in-part of application No. 11/229,485, filed on Sep. 16, 2005, now Pat. No. 9,639,554.

(60) Provisional application No. 61/030,043, filed on Feb. 20, 2008, provisional application No. 60/802,922, filed on May 23, 2006, provisional application No. 60/637,407, filed on Dec. 17, 2004.

(51) Int. Cl.
*G06F 16/13* (2019.01)
*G06F 16/17* (2019.01)

(58) Field of Classification Search
CPC ..... G06F 2212/7202; G06F 2212/7205; G06F 3/061; G06F 3/0643; G06F 16/11; G06F 16/1727; G06F 16/13
USPC .......................................... 707/821, 770, 620
See application file for complete search history.

(56) References Cited

U.S. PATENT DOCUMENTS

| | | |
|---|---|---|
| 5,083,264 A | 1/1992 | Platteter et al. |
| 5,086,502 A | 2/1992 | Malcolm |
| 5,201,044 A | 4/1993 | Frey et al. |
| 5,202,982 A | 4/1993 | Gramlich et al. |
| 5,297,148 A | 3/1994 | Harari et al. |
| 5,307,494 A | 4/1994 | Yasumatsu et al. |
| 5,313,646 A | 5/1994 | Hendricks et al. |
| 5,359,725 A | 10/1994 | Garcia et al. |
| 5,363,487 A | 11/1994 | Willman et al. |
| 5,367,671 A | 11/1994 | Feigenbaum et al. |
| 5,371,885 A | 12/1994 | Letwin |
| 5,388,257 A | 2/1995 | Bauer |
| 5,392,427 A | 2/1995 | Barrett et al. |
| 5,412,808 A | 5/1995 | Bauer |
| 5,421,001 A | 5/1995 | Methe |
| 5,434,974 A | 7/1995 | Loucks et al. |
| 5,437,029 A | 7/1995 | Sinha |
| 5,469,562 A | 11/1995 | Saether |
| 5,483,652 A | 1/1996 | Sudama et al. |
| 5,535,375 A | 7/1996 | Eshel et al. |
| 5,537,636 A | 7/1996 | Uchida et al. |
| 5,546,389 A | 8/1996 | Wippenbeck et al. |
| 5,574,907 A | 11/1996 | Jernigan et al. |
| 5,579,517 A | 11/1996 | Reynolds et al. |
| 5,596,755 A | 1/1997 | Pletcher et al. |
| 5,627,996 A | 5/1997 | Bauer |
| 5,694,606 A | 12/1997 | Pletcher et al. |
| 5,699,548 A | 12/1997 | Choudhury et al. |
| 5,732,268 A | 3/1998 | Bizzarri |
| 5,734,340 A | 3/1998 | Kennedy |
| 5,745,752 A | 4/1998 | Hurvig et al. |
| 5,745,902 A | 4/1998 | Miller et al. |
| 5,754,848 A | 5/1998 | Hanes |
| 5,758,352 A | 5/1998 | Reynolds et al. |
| 5,761,675 A | 6/1998 | Isenberg |
| 5,761,677 A | 6/1998 | Senator et al. |
| 5,765,169 A | 6/1998 | Conner |
| 5,778,168 A | 7/1998 | Fuller |
| 5,813,011 A | 9/1998 | Yoshida et al. |
| 5,819,275 A | 10/1998 | Badger et al. |
| 5,825,734 A | 10/1998 | Igarashi et al. |
| 5,832,515 A | 11/1998 | Ledain et al. |
| 5,850,506 A | 12/1998 | Gordons |
| 5,898,868 A | 4/1999 | Krueger et al. |
| 5,907,672 A | 5/1999 | Matze et al. |
| 5,923,884 A | 7/1999 | Peyret et al. |
| 5,926,805 A | 7/1999 | Hurvig et al. |
| 5,930,828 A | 7/1999 | Jensen et al. |
| 5,968,127 A | 10/1999 | Kawabe et al. |
| 5,983,240 A | 11/1999 | Shoroff et al. |
| 6,023,744 A | 2/2000 | Shoroff et al. |
| 6,032,223 A | 2/2000 | Beelitz |
| 6,037,738 A | 3/2000 | Morita et al. |
| 6,038,636 A | 3/2000 | Brown et al. |
| 6,049,807 A | 4/2000 | Carroll et al. |
| 6,055,527 A | 4/2000 | Badger et al. |
| 6,078,999 A | 6/2000 | Raju et al. |
| 6,081,804 A | 6/2000 | Smith |
| 6,108,759 A | 8/2000 | Orcutt et al. |
| 6,144,969 A | 11/2000 | Inokuchi et al. |
| 6,192,432 B1 | 2/2001 | Slivka et al. |
| 6,194,432 B1 | 2/2001 | Sheftell et al. |
| 6,205,558 B1 | 3/2001 | Sobel |
| 6,253,300 B1 | 6/2001 | Lawrence et al. |
| 6,286,013 B1 * | 9/2001 | Reynolds .......... G06F 17/30123 707/823 |
| 6,286,113 B1 | 9/2001 | Sembach et al. |
| 6,374,265 B1 | 4/2002 | Chen et al. |
| 6,374,268 B1 | 4/2002 | Testardi |
| 6,377,958 B1 | 4/2002 | Orcutt |
| 6,378,031 B1 | 4/2002 | Kuno et al. |
| 6,427,123 B1 | 7/2002 | Sedlar |
| 6,470,345 B1 | 10/2002 | Doutre et al. |
| 6,510,552 B1 | 1/2003 | Benayoun et al. |
| 6,529,966 B1 | 3/2003 | Willman et al. |
| 6,571,259 B1 | 5/2003 | Zheng et al. |
| 6,594,725 B2 | 7/2003 | Ando et al. |
| 6,611,907 B1 | 8/2003 | Maeda et al. |
| 6,612,490 B1 | 9/2003 | Herrendoerfer et al. |
| 6,615,365 B1 * | 9/2003 | Jenevein ............ G06F 11/1417 711/161 |
| 6,615,404 B1 | 9/2003 | Garfunkel et al. |
| 6,654,772 B1 | 11/2003 | Crow et al. |
| 6,658,437 B1 | 12/2003 | Lehman |
| 6,662,309 B2 | 12/2003 | Ando et al. |
| 6,675,180 B2 | 1/2004 | Yamashita |
| 6,792,518 B2 | 9/2004 | Armangau et al. |
| 6,856,993 B1 | 2/2005 | Verma et al. |
| 6,883,114 B2 | 4/2005 | Lasser |
| 6,907,184 B1 | 6/2005 | Yokota et al. |
| 6,922,708 B1 | 7/2005 | Sedlar |
| 6,972,518 B2 | 12/2005 | Heimgartner et al. |
| 7,032,107 B2 | 4/2006 | Stutton et al. |
| 7,051,251 B2 | 5/2006 | Moore et al. |
| 7,062,602 B1 | 6/2006 | Moore et al. |
| 7,072,917 B2 | 7/2006 | Wong et al. |
| 7,089,448 B2 | 8/2006 | Hinshaw et al. |
| 7,092,870 B1 | 8/2006 | Chen et al. |
| 7,174,420 B2 | 2/2007 | Malueg et al. |
| 7,274,857 B2 | 9/2007 | Nallur et al. |
| 7,363,540 B2 | 4/2008 | Patel et al. |
| 7,380,140 B1 | 5/2008 | Weissman et al. |
| 7,380,157 B2 | 5/2008 | Brewer et al. |
| 7,383,288 B2 | 6/2008 | Miloushev et al. |
| 7,493,445 B2 | 2/2009 | Harada |
| 7,613,738 B2 | 11/2009 | Patel et al. |
| 7,620,620 B1 | 11/2009 | Sedlar |
| 7,676,491 B2 | 3/2010 | Jansen et al. |
| 7,685,171 B1 | 3/2010 | Beaverson et al. |
| 7,747,664 B2 | 6/2010 | Patel et al. |
| 7,757,100 B2 * | 7/2010 | Weissman ............ G06F 21/575 709/213 |
| 7,873,596 B2 | 1/2011 | Pudipeddi et al. |
| 7,941,435 B2 | 5/2011 | Kao et al. |
| 7,979,409 B2 | 7/2011 | Kime |
| 8,001,165 B2 | 8/2011 | Patel et al. |
| 8,024,383 B2 | 9/2011 | Patel et al. |
| 8,024,507 B2 | 9/2011 | Patel et al. |
| 8,156,165 B2 | 4/2012 | Malueg et al. |
| 8,321,439 B2 | 11/2012 | Pudipeddi et al. |
| 8,352,697 B2 | 1/2013 | Lasser |
| 8,364,732 B2 | 1/2013 | Pudipeddi et al. |
| 8,433,677 B2 | 4/2013 | Pudipeddi et al. |
| 8,452,729 B2 | 5/2013 | Pudipeddi et al. |
| 8,583,708 B2 | 11/2013 | Pudipeddi et al. |

(56) References Cited

U.S. PATENT DOCUMENTS

| | | |
|---|---|---|
| 8,606,830 B2 | 12/2013 | Pudipeddi et al. |
| 8,725,772 B2 | 5/2014 | Pudipeddi et al. |
| 2001/0016841 A1 | 8/2001 | Karasudani |
| 2001/0054129 A1 | 12/2001 | Wouters |
| 2002/0040361 A1 | 4/2002 | Tikkanen et al. |
| 2002/0042796 A1 | 4/2002 | Igakura |
| 2002/0062301 A1 | 5/2002 | Rudoff et al. |
| 2002/0116406 A1 | 8/2002 | Goldick |
| 2002/0152354 A1 | 10/2002 | Harmer |
| 2003/0028765 A1 | 2/2003 | Cromer et al. |
| 2003/0088587 A1 | 5/2003 | Merrells et al. |
| 2003/0105781 A1 | 6/2003 | Morris |
| 2003/0135650 A1 | 7/2003 | Kano et al. |
| 2003/0163802 A1 | 8/2003 | Takahashi |
| 2003/0177107 A1 | 9/2003 | Brown et al. |
| 2003/0182330 A1 | 9/2003 | Manley et al. |
| 2003/0182389 A1 | 9/2003 | Edwards |
| 2003/0221095 A1 | 11/2003 | Gaunt et al. |
| 2003/0233385 A1 | 12/2003 | Srinivasa et al. |
| 2004/0003289 A1 | 1/2004 | Bhogal et al. |
| 2004/0030847 A1 | 2/2004 | Tremaine |
| 2004/0064483 A1 | 4/2004 | Bulka et al. |
| 2004/0078704 A1 | 4/2004 | Malueg et al. |
| 2004/0210706 A1 | 10/2004 | In et al. |
| 2004/0215600 A1 | 10/2004 | Aridor et al. |
| 2004/0250172 A1 | 12/2004 | Patel et al. |
| 2005/0015354 A1 | 1/2005 | Grubbs et al. |
| 2005/0027746 A1 | 2/2005 | Lin et al. |
| 2005/0060316 A1 | 3/2005 | Kamath et al. |
| 2005/0172005 A1 | 8/2005 | Goodwin |
| 2005/0246612 A1 | 11/2005 | Leis et al. |
| 2005/0256838 A1 | 11/2005 | Lasser |
| 2006/0020745 A1 | 1/2006 | Conley et al. |
| 2006/0095649 A1 | 5/2006 | Netter et al. |
| 2006/0136529 A1 | 6/2006 | Pudipeddi et al. |
| 2006/0224578 A1 | 10/2006 | Kadatch et al. |
| 2007/0136387 A1 | 6/2007 | Malueg et al. |
| 2007/0239957 A1 | 10/2007 | Lin |
| 2008/0091702 A1 | 4/2008 | Pudipeddi et al. |
| 2008/0168029 A1 | 7/2008 | Pudipeddi et al. |
| 2008/0172425 A1 | 7/2008 | Patel et al. |
| 2008/0172426 A1 | 7/2008 | Patel et al. |
| 2008/0177939 A1 | 7/2008 | Patel et al. |
| 2008/0215646 A1 | 9/2008 | Pudipeddi et al. |
| 2008/0215647 A1 | 9/2008 | Pudipeddi et al. |
| 2009/0164440 A1 | 6/2009 | Pudipeddi et al. |
| 2009/0164539 A1 | 6/2009 | Pudipeddi et al. |
| 2009/0265400 A1 | 10/2009 | Pudipeddi et al. |
| 2010/0049776 A1 | 2/2010 | Patel et al. |
| 2010/0217788 A1 | 8/2010 | Patel et al. |
| 2012/0011177 A1 | 1/2012 | Patel et al. |
| 2012/0011179 A1 | 1/2012 | Patel et al. |
| 2013/0080485 A1 | 3/2013 | Pudipeddi et al. |

FOREIGN PATENT DOCUMENTS

| | | |
|---|---|---|
| CN | 1790328 A | 6/2006 |
| EP | 0416445 A2 | 3/1991 |
| EP | 462587 A2 | 12/1991 |
| EP | 618540 B2 | 10/1994 |
| EP | 1376405 A2 | 1/2004 |
| EP | 1677214 A1 | 7/2006 |
| IL | 172014 A | 2/2015 |
| JP | S6441039 A | 2/1989 |
| JP | 1315843 A | 12/1989 |
| JP | 2148341 A | 6/1990 |
| JP | 3017753 A | 1/1991 |
| JP | 4188239 A | 7/1992 |
| JP | 6019763 A | 1/1994 |
| JP | H06103140 A | 4/1994 |
| JP | 7234879 A | 9/1995 |
| JP | 2001160068 A | 6/2001 |
| JP | 2001325134 A | 11/2001 |
| JP | 2002099454 A | 4/2002 |
| JP | 20020132566 A | 5/2002 |
| JP | 20030162709 A | 6/2003 |
| JP | 20030345708 A | 12/2003 |
| JP | 20040288007 A | 10/2004 |
| RU | 2159467 C2 | 11/2000 |
| RU | 2170454 C2 | 7/2001 |
| TW | 533377 B | 5/2003 |
| WO | 111486 A2 | 2/2001 |

OTHER PUBLICATIONS

"Office Action Issued in Australian Patent Application No. 2005229678", dated May 17, 2010, 1 Page.

"Office Action Issued in Japanese Patent Application No. 2012-040595", dated Mar. 26, 2013, 4 Pages.

"Office Action Issued in Chile Patent Application No. 2936-05", dated Nov. 11, 2005, 6 Pages.

Amy, Rich, "ZFS, Sun's Cutting-Edge File System (Part 1: Storage Integrity, Security, and Scalability)", In BigAdmin System Administration Portal, Aug. 2006, 8 Pages.

Barreto, et al., "A Highly Available Replicated File System for Resource-Constrained Windows CE .Net Devices", In 3rd International Conference on .Net Technologies, May 30, 2005, 6 Pages.

Bonner, Paul, "Build a Document Manager Under Windows", In PC/Computing, vol. 04, Issue 12, Dec. 10, 1991, 10 Pages.

Bonner, Paul, "What's in a Name?", In PC/Computing, vol. 2, Issue 9, Sep. 1989, 2 Pages.

Chen, et al., "The Rio File Cache: Surviving Operating System Crashes", In Proceedings of the Seventh International Conference on Architectural Support for Programming Languages and Operating Systems, Oct. 1, 1996, 11 Pages.

Duncan, Ray, "Design Goals and Implementation of the New High Performance File System", In Journal of Microsoft Systems, vol. 4, Issue 5, Sep. 1989, 13 Pages.

Duncan, Ray, "Power Programming Using Long Filenames and Extended Attributes, Part 1", In PC Magazine, vol. 9, Issue 8, Apr. 24, 1990, 6 Pages.

Duncan, Ray, "Power Programming Using Long Filenames and Extended Attributes, Part II", In PC Magazine, May 15, 1990, 6 Pages.

Farr, et al., "An Optimum Disc Organization for a Virtual Memory System", In Computer Design, Jun. 1971, 7 Pages.

Glass, Brett, "Create Your Own Environment", In Journal of PC-Computing, vol. 3, Issue 10, Oct. 1990, 5 Pages.

Hiroo, Shirasaki, "Observe the Boot Process of FreeBSD 14", In UNIX Magazine, vol. 20, Issue 2, ASCII Corporation, Japan, Feb. 1, 2005, pp. 91-99.

Hurwicz, Mike, "MS-DOS 3.1 Makes It Easy to Use IBM PCs on a Network", In Data Communications, Nov. 1985, 10 Pages.

Jonnge, et al., "The Logical Disk: A New Approach to Improving File Systems", In Proceedings of the Fourteenth ACM Symposium on Operating Systems Principles, Dec. 1993, 14 Pages.

Karpovich, et al., "Extensible File System (ELFS): An Object-Oriented Approach to High Performance File I/O", In Proceedings of the Ninth Annual Conference on Object-Oriented Programming Systems, Language, and Applications, Jul. 22, 1994, pp. 191-204.

Kashyap, Aditya, "File System Extensibility and Reliability Using an in-Kernel Database", A Thesis Presented to the Graduate School in partial fulfillment of the Requirements for the degree of Master of Science in Computer Science, Stony Brook University, Dec. 2004, 30 Pages.

Khalidi, et al., "Extensible File System in Spring", In SOSP '93 Proceedings of the Fourteenth ACM Symposium on Operating Systems Principles, Jan. 3, 1994, 18 Pages.

Leffler, et al., "The Design and Implementation of the 4.3BSD UNIX Operating System", By Addison-Wesley Publishing Company, Jun. 1, 1989, 5 Pages.

Lent, et al., "New, Improved Windows", In PC World, vol. 11, Issue 12, Dec. 1993, 17 Pages.

Mallory, Jim, "Breakthrough on DOS Filename Limits", In Newsbytes, NEW04120025, Retrieved on: May 24, 2006, 1 Page.

McCormick, John, "Presentation Manager Under OS/2 Encourages Lengthy Name-Calling", In Government Computer News, vol. 09, Issue 10, May 14, 1990, 2 Pages.

(56) References Cited

OTHER PUBLICATIONS

O'Malley, Chris, "Fetching Desktop Files: Standalone Document Managers", In Windows Sources, vol. 1, Issue 2, Mar. 1993, 2 Pages.
Otoo, et al., "Non-shared Disk Cluster—A Fault Tolerant, Commodity Approach to Hi-Bandwidth Data Analysis", Retrieved from <<http://citeseerx.ist.psu.edu/viewdoc/download?doi=10.1.1.133.7039&rep=rep1&type=pdf>>, Retrieved on: Sep. 2001, 6 Pages.
"Office Action Issued in Mexican Patent Application No. PA/a/2005/012405", dated Mar. 10, 2010, 4 Pages.
"Office Action Issued in Mexican Patent Application No. PA/a/2005/012405", dated May 6, 2009, 2 Pages.
Rohan, Rebecca, "Golden Retriever Fetches Files in Windows", In Journal of Computer Shopper, vol. 12, Issue 11, Nov. 1, 1992, 2 Pages.
San, Lee Chiung., "Server-Based Maintenance Approach for Computer Classroom Workstations", In IEICE Transactions on Information and Systems, vol. E83-D, Issue 4, Apr. 25, 2000, pp. 807-814.
Shullich, Robert, "Reverse Engineering the Microsoft Extended FAT File System (exFAT)", In SANS Institute InfoSec Reading Room, Dec. 1, 2009, 86 Pages.
Sivathanu, et al., "Life or Death at Block-Level", In Proceedings of the 6th Symposium on Operating Systems Design and Implementation (OSDI '04), Dec. 6, 2004, 16 Pages.
Tanenbaum, et al., "Minix Operating System", In Book File System, Chapter 5, 1989, pp. 310-313.
Tanenbaum, Andrew S., "Modern Operating Systems", In Second Edition of Prentice Hall, Jan. 2001, 17 Pages.
Trivette, Donald B., "Utility Provides 60-Character Filenames", In PC Magazine, vol. 07, Issue 16, Sep. 27, 1988, 1 Page.
Wang, Gail Y.E., "Universal_File_Names for Ada", In ACM SigAda, Ada Letters vol. 10, Issue 1, Jan. 1990, pp. 111-117.
Yamamori, Takenori, "Guide to Rise Higher than a Novice, PC UNIX Deciphered from Boot Files", In Software Design, Issue 131, Sep. 18, 2001, pp. 110-121.
"Notice of Allowance Issued in U.S. Appl. No. 14/099,307", Dated Oct. 7, 2016, 7 Pages.
"Non Final Office Action issued in U.S. Appl. No. 11/752,872", dated Nov. 12, 2009, 7 Pages.
"Non Final Office Action Issued in U.S. Appl. No. 11/752,872", dated Jul. 23, 2009, 5 Pages.
"Notice of Allowance Issued in U.S. Appl. No. 11/752,872", dated May 6, 2010, 7 Pages.
"Notice of Allowance Issued in U.S. Appl. No. 11/752,872", dated Jul. 8, 2010, 5 Pages.
"Notice of Allowance Issued in U.S. Appl. No. 11/752,872", dated Sep. 2, 2010, 5 Pages.
"Notice of Allowance Issued in U.S. Appl. No. 11/752,872", dated Nov. 30, 2010, 4 Pages.
"Non Final Office Action Issued in U.S. Appl. No. 13/006,063", dated Apr. 27, 2011, 5 Pages.
"Notice of Allowance Issued in U.S. Appl. No. 13/006,063", dated Nov. 26, 2012, 10 Pages.
"Notice of Allowance Issued in U.S. Appl. No. 13/006,088", dated Aug. 14, 2012, 3 Pages.
"Notice of Allowance Issued in U.S. Appl. No. 13/006,088", dated Sep. 11, 2012, 6 Pages.
"Non Final Office Action Issued in U.S. Appl. No. 13/162,189", dated Nov. 10, 2011, 7 Pages.
"Notice of Allowance Issued in U.S. Appl. No. 13/162,189", dated Apr. 6, 2012, 6 Pages.
"Notice of Allowance Issued in U.S. Appl. No. 13/162,189", dated Aug. 15, 2012, 6 Pages.
"Notice of Allowance Issued in U.S. Appl. No. 13/162,189", dated Dec. 24, 2012, 6 Pages.
"Notice of Allowance Issued in U.S. Appl. No. 13/875,386", dated Jan. 7, 2014, 7 Pages.
"Final Office Action Issued in U.S. Appl. No. 13/901,997", dated Jan. 14, 2014, 6 Pages.
"Notice of Allowance Issued in U.S. Appl. No. 13/901,997", dated Apr. 1, 2014, 9 Pages.
"Non Final Office Action Issued in U.S. Appl. No. 14/456,419", dated Jan. 15, 2015, 6 Pages.
"Notice of Allowance Issued in U.S. Appl. No. 14/456,419", dated Apr. 29, 2015, 6 Pages.
"Non-Final Office Action Issued in U.S. Appl. No. 14/815,076", dated Feb. 26, 2016, 7 Pages.
"Notice of Allowance Issued in U.S. Appl. No. 14/815,076", dated Jun. 10, 2016, 6 Pages.
"Notice of Allowance Issued in U.S. Appl. No. 14/815,076", dated Sep. 16, 2016, 5 Pages.
"Transactional File Access", In Commons Transactions by Apache Commons, Version: 1.3-SNAPSHOT, Jun. 2, 2005, 1 Page.
"Transaction-Safe FAT File System", Retrieved from <<https://msdn.microsoft.com/en-us/library/aa516909.aspx>>, Retrieved on: May 30, 2006, 1 Page.
"Notice of Allowance Issued in U.S. Appl. No. 13/006,063", dated Jan. 2, 2013, 6 Pages.
"Non Final Office Action Issued in U.S. Appl. No. 13/006,088", dated May 18, 2011, 8 Pages.
"Non Final Office Action Issued in U.S. Appl. No. 13/006,088", dated Dec. 21, 2011, 8 Pages.
"Notice of Allowance Issued in U.S. Appl. No. 13/006,088", dated Jun. 5, 2012, 10 Pages.
"World Software Corporation (WSC) Launches Extend-a-name in Europe", In Computer Product Update, Jul. 27, 1990, 2 Pages.
"Office Action Issued in European Patent Application No. 05111554.1", dated Jun. 24, 2009, 4 Pages.
"Above Software Introduces Golden Retriever 2.0b", In Proceedings of News Release, Mar. 29, 1993, 1 Page.
"File Sharing Protocol", Retrieved from <<https://download.samba.org/pub/samba/specs/corep.txt>>, Nov. 7, 1988, 69 Pages.
"Flush", In Book Microsoft Press Computer Dictionary Third Edition, Published by Microsoft Press, Jan. 1997, 1 Page.
"Fragmentation", In Book Microsoft Press Computer Dictionary Third Edition, Published by Microsoft Press, Jan. 1997, 1 Page.
"Non Final Office Action Issued in U.S. Appl. No. 13/875,386", dated Jul. 30, 2013, 10 Pages.
"Long Filenames", In Windows 95 Beta 2 Release SDK, Article 15, Oct. 28, 1994, 29 Pages.
"The Intelligent Way to Search", In News Release, Dateline: Burlington, Massachusetts, Oct. 1987, 1 Page.
"Non Final Office Action Issued in U.S. Appl. No. 13/901,997", dated Jul. 15, 2013, 6 Pages.
"Final Office Action Issued in U.S. Appl. No. 12/389,391", dated Feb. 21, 2013, 10 Pages.
"Final Office Action Issued in U.S Appl. No. 14/099,307", dated Jun. 17, 2016, 11 Pages.
"Non-Final Office Action Issued in U.S. Appl. No. 14/099,307", dated Apr. 8, 2015, 10 Pages.
"Non-Final Office Action Issued in U.S. Appl. No. 14/099,307", dated Oct. 23, 2015, 9 Pages.
"Non Final Office Action issued in U.S. Appl. No. 12/389,391", dated Apr. 14, 2011, 12 Pages.
"Non Final Office Action issued in U.S. Appl. No. 12/389,391", dated Jul. 31, 2012, 7 Pages.
"Notice of Allowance Issued in U.S. Appl. No. 12/389,391", dated Aug. 7, 2013, 13 Pages.
"Final Office Action Issued in U.S. Appl. No. 13/006,063", dated May 30, 2012, 8 Pages.
"Non Final Office Action Issued in U.S. Appl. No. 13/006,063", dated Dec. 22, 2011, 7 Pages.
"Office Action Issued in Israel Patent Application No. 172014", dated Dec. 17, 2009, 4 Pages.
"Office Action Issued in Chinese Patent Application No. 200510125054.1", dated Jul. 4, 2008, 8 Pages.
"Office Action Issued in Chinese Patent Application No. 200510125054.1", dated Jan. 15, 2010, 9 Pages.
U.S. Appl. No. 15/397,093; Non-Final Office Action; dated Aug. 11, 2017; 15 pages.
Brazil Patent Application No. PI0505077-4; Office Action; dated Jul. 17, 2017; 9 pages.

(56) References Cited

OTHER PUBLICATIONS

Bob Eager; "Implementation of extended attributes on the FAT filed"; Tavi Systems; © 2000; 3 pages.
"Universal Disk Format® Specification"; Revision 2.50; Apr. 30, 2003; Optical Storage Technology Association; 165 pages.
"Notice of Allowance Issued in Taiwan Patent Application No. 105136602", dated Oct. 24, 2017, 6 Pages.
"Non Final Office Action Issued in U.S. Appl. No. 14/842,963", dated Jan. 10, 2018, 34 Pages.
"Non Final Office Action Issued in U.S. Appl. No. 13/685,018", dated Nov. 23, 2015, 18 Pages.
"Final Office Action Issued in U.S. Appl. No. 14/075,525", dated May 1, 2015, 12 Pages.
"Non-Final Office Action Issued in U.S. Appl. No. 14/075,525", dated Jul. 28, 2014, 10 Pages.
"Office Action Issued in Israel Patent Application No. 172014", dated Aug. 31, 2014, 1 Page. (W/o English Translation).
"Office Action Issued in Israel Patent Application No. 172014", dated Oct. 15, 2013, 7 Pages.
"Office Action Issued in Canadian Patent Application No. 2527060", dated Sep. 5, 2012, 2 Pages.
"Office Action Issued in Canadian Patent Application No. 2527060", dated Mar. 25, 2014, 3 Pages.
"Office Action Issued in Canadian Patent Application No. 2820339", dated Apr. 28, 2015, 5 Pages.
"Corrected Office Action Issued in Singapore Patent Application No. 200507941-3", dated Nov. 12, 2007, 3 Pages.
"Office Action Issued in Singapore Patent Application No. 200507941-3", dated Feb. 19, 2007, 7 Pages.
"Third Office Action Issued in Chinese Patent Application No. 200510125054.1", dated Jul. 13, 2011, 6 Pages.
"Office Action Issued in Russian Patent Application No. 2005134810", dated Dec. 14, 2009, 5 Pages. (w/o English Translation).
"Office Action Issued in Russian Patent Application No. 2005134810", dated Oct. 12, 2010, 4 Pages. (w/o English Translation).
"Office Action Issued in Japanese Patent Application No. 2005-364036", dated Jun. 3, 2011, 6 Pages.
"Office Action Issued in Japanese Patent Application No. 2005-364036", dated Oct. 25, 2011, 4 Pages.
"Office Action Issued in Norway Patent Application No. 20056016", dated Jan. 27, 2015, 2 Pages.
"Office Action Issued in Norway Patent Application No. 20056016", dated Mar. 26, 2014, 5 Pages.
"First Office Action Issued in Chinese Patent Application No. 201010189026.7", dated Nov. 25, 2010, 8 Pages.
"Office Action Issued in Russian Patent Application No. 2010119961", dated Feb. 17, 2015, 5 pPages. (w/o English Translation).
"Office Action Issued in Japanese Patent Application No. 2010-129852", dated Apr. 13, 2012, 4 Pages.
"Office Action Issued in Japanese Patent Application No. 2010-129852", dated Sep. 7, 2012, 4 Pages.
"Office Action Issued in Russian Patent Application No. 2011106779", dated Feb. 6, 2015, 3 Pages. (w/o English Translation).
"Office Action Issued in Australian Patent Application No. 2011200838", dated May 18, 2011, 1 Page.
"Administrative Pleadings Published in Administrative Pleadings 201210063035.0", dated Apr. 18, 2016, 54 Pages.
"Decision on the request for Invalidation of Patent Right Published in Chinese Patent Application No. 201210063035.0", dated Apr. 18, 2016, 58 Pages.
"First Office Action and Search Report Issued in Chinese Patent Application No. 201210063035.0", dated Jan. 26, 2014, 11 Pages.
"Second Office Action and Search Report Issued in Chinese Patent Application No. 201210063035.0", dated Sep. 2, 2014, 13 Pages.
"Office Action Issued in Japanese Patent Application No. 2013-000671", dated Oct. 15, 2013, 4 Pages.
"Office Action and Search Report Issued in Norway Patent Application No. 20151214", dated Oct. 27, 2015, 5 Pages.
"Office Action Issued in Norway Patent Application No. 20161346", dated Dec. 28, 2016, 5 Pages.
"Office Action Issued in Philippines Patent Application No. 1-2011-000219", dated Oct. 21, 2011, 1 Page.
"Office Action Issued in Philippines Patent Application No. 1-2011-000219", dated Oct. 27, 2014, 1 Page.
"Office Action Issued in Malaysian Patent Application No. PI 20055510", dated Jun. 29, 2012, 4 Pages.
"Office Action Issued in Indian Patent Application No. 3021/DEL/2005", dated Dec. 19, 2013, 1 Page.
"Office Action Issued in Indian Patent Application No. 3021/DEL/2005", dated May 1, 2015, 1 Page.
"Office Action and Search Report Issued in Taiwan Patent Application No. 94139703", dated Oct. 5, 2012, 10 Pages.
"Office Action Issued in Taiwan Patent Application No. 94139703", dated Mar. 25, 2013, 3 Pages. (w/o English Translation).
Gooch, Richard., "Overview of the Linux Virtual File Systems", Retrieved From https://www.kernel.org/doc/Documentation/filesystems/vfs.txt, Jun. 24, 2007, 18 Pages.
Karpovich, et al., "Breaking the I/O Bottleneck at the National Radio Astronomy Observatory (NRAO)", In Technical Report CS-94-37, University of Virginia, Department of Computer Science, Sep. 1993, 43 Pages.
"Office Action Issued in Mexico Patent Application No. MX/a/2010/012831", dated Mar. 22, 2013, 3 Pages. (w/o English Translation).
"Office Action Issued in Indonesia Patent Application No. P00200500645", dated May 14, 2010, 2 Pages.
"Office Action Issued in Philippines Patent Application No. PH/1/2005/563", dated Apr. 29, 2011, 1 Page.
"Office Action Issued in Philippines Patent Application No. PH/1/2005/563", dated Aug. 26, 2008, 1 Page.
Tanenbaum, Andrew S., "Chapter 6: File Systems and Chapter 11: Case Study 2: Windows 2000 763", In Book of Modern Operating Systems, Second Edition, Published by Prentice Hall International, Mar. 3, 2001, 18 Pages.
Muthitacharoen et al.; "A low-bandwidth network file system"; 18th ACM Symposium on Operating Systems Principles; 2001; 14 pages.
"European Search Report Issued in Patent Application No. 05111554.1", dated May 24, 2006, 8 Pages.
"Letter from Opponent to Withdrawn published in European Patent Application No. 05111554.1", dated Apr. 18, 2018, 2 Pages.
"Notice of Opposition Published in European Patent Application No. 05111554.1", dated Feb. 11, 2015, 38 Pages.
"Office Action Issued in European Patent Application No. 05111554.1", dated Feb. 12, 2007, 5 Pages.
"Summons to Attend Oral Proceedings Issued in European Patent Application No. 05111554.1", dated Sep. 23, 2010, 14 Pages.
"Summons to Oral Proceedings Issued in European Patent Application No. 05111554.1", dated Jul. 18, 2013, 13 Pages.
"Office Action Issued in European Patent Application No. 05111554.1", dated Dec. 20, 2007, 7 Pages.
"Summons to Attend Oral Proceedings Issued in European Patent Application No. 05111554.1", dated Oct. 36, 2015, 10 Pages.
"European Search Report Issued in Application No. 10012810.7", dated Jan. 21, 2011, 5 Pages.
"Office Action Issued in European Patent Application No. 10012810.7", dated Jan. 5, 2012, 7 Pages.
"Office Action Issued in European Patent Application No. 10012810.7", dated Jul. 28, 2015, 4 Pages.
"European Search Report Issued in Application No. 10012811.5", dated Jan. 21, 2011, 11 Pages.
"Office Action Issued in European Patent Application No. 10012811.5", dated Jul. 28, 2015, 4 Pages.
"Office Action Issued in Korean Patent Application No. 10-2005-0110061", dated Jun. 20, 2012, 4 Pages.
"Office Action Issued in Korean Patent Application No. 10-2010-0112978", dated Jun. 20, 2012, 4 Pages.
"Office Action Issued in Taiwan Patent Application No. 102144605", dated Nov. 24, 2015, 7 Pages.
"Office Action Issued in Taiwan Patent Application No. 102144605", dated Aug. 19, 2016, 4 Pages.
"Decision on Appeal Issued in U.S. Appl. No. 11/229,485", dated Apr. 26, 2016, 6 Pages.

(56) References Cited

OTHER PUBLICATIONS

"Examination Answer Issued in U.S. Appl. No. 11/229,485", dated Oct. 23, 2013, 13 Pages.
"Final Office Action Issued in U.S. Appl. No. 11/229,485", dated Nov. 12, 2010, 17 Pages.
"Final Office Action Issued in U.S. Appl. No. 11/229,485", dated Jul. 16, 2008, 12 Pages.
"Final Office Action Issued in U.S. Appl. No. 11/229,485", dated Aug. 18, 2009, 9 Pages.
"Final Office Action Issued in U.S. Appl. No. 11/229,485", dated Oct. 17, 2012, 18 Pages.
"Non-Final Office Action Issued in U.S. Appl. No. 11/229,485", dated Mar. 30, 2012, 20 Pages.
"Non-Final Office Action Issued in U.S. Appl. No. 11/229,485", dated Nov. 7, 2007, 14 Pages.
"Non-Final Office Action Issued in U.S. Appl. No. 11/229,485", dated Jan. 15, 2009, 11 Pages.
"Non-Final Office Action Issued in U.S. Appl. No. 11/229,485", dated Feb. 22, 2010, 11 Pages.
"Final Office Action Issued in U.S. Appl. No. 12/052,584", dated Jan. 20, 2011, 19 Pages.
"Final Office Action Issued in U.S. Appl. No. 12/052,584", dated Nov. 19, 2012, 11 Pages.
"Non-Final Office Action Issued in U.S. Appl. No. 12/052,584", dated Aug. 17, 2011, 10 Pages.
"Non-Final Office Action Issued in U.S. Appl. No. 12/052,584", dated Jun. 14, 2010, 18 Pages.
"Non-Final Office Action Issued in U.S. Appl. No. 12/052,584", dated Feb. 29, 2012, 11 Pages.
"Final Office Action Issued in U.S. Appl. No. 12/052,594", dated Apr. 18, 2011, 23 Pages.
"Final Office Action Issued in U.S. Appl. No. 12/052,594", dated Jan. 17, 2013, 24 Pages.
"Non-Final Office Action Issued in U.S. Appl. No. 12/052,594", dated Aug. 6, 2010, 16 Pages.
"Non-Final Office Action Issued in U.S. Appl. No. 12/052,594", dated Jun. 12, 2012, 21 Pages.
"Final Office Action Issued in U.S. Appl. No. 12/052,603", dated Jul. 16, 2014, 11 Pages.
"Final Office Action Issued in U.S. Appl. No. 12/052,603", dated Apr. 15, 2011, 12 Pages.
"Final Office Action Issued in U.S. Appl. No. 12/052,603", dated Dec. 19, 2012, 13 Pages.
"Non-Final Office Action Issued in U.S. Appl. No. 12/052,603", dated Dec. 17, 2013, 13 Pages.
"Non-Final Office Action Issued in U.S. Appl. No. No. 12/052,603", dated Jul. 6, 2012, 11 Pages.
"Non-Final Office Action Issued in U.S. Appl. No. 12/052,603", dated Aug. 24, 2010, 11 Pages.
"Non Final Office Action Issued in U.S. Appl. No. 12/389,396", dated Oct. 31, 2011, 12 Pages.
"Final Office Action Issued in U.S. Appl. No. 12/493,172", dated Apr. 24, 2012, 25 Pages.
"Final Office Action Issued in U.S. Appl. No. 12/493,172", dated Nov. 21, 2013, 20 Pages.
"Non Final Office Action Issued in U.S. Appl. No. 12/493,172", dated Mar. 14, 2013, 34 Pages.
"Non-Final Office Action Issued in U.S. Appl. No. 12/493,172", dated Jun. 17, 2014, 23 Pages.
"Non-Final Office Action Issued in U.S. Appl. No. 12/493,172", dated Aug. 31, 2011, 16 Pages.
"Final Office Action Issued in U.S. Appl. No. 12/493,172", dated Dec. 29, 2014, 23 Pages.
"Office Action Issued in Philippines Patent Application No. Jan. 2011-000219", dated Feb. 12, 2018, 2 Pages.
"Office Action Issued in European Application No. 10012810.7", dated Sep. 21, 2018, 4 Pages.
"Office Action Issued in European Application No. 10012811.5", dated Sep. 20, 2018, 5 Pages.
"Non Final Office Action Issued in U.S. Appl. No. 14/842,963", dated Sep. 21, 2018, 35 Pages.

* cited by examiner

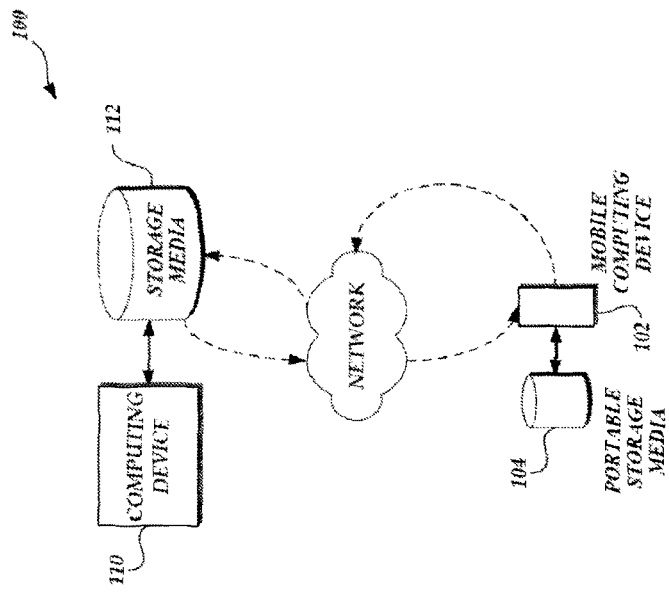
*Fig.1C.*
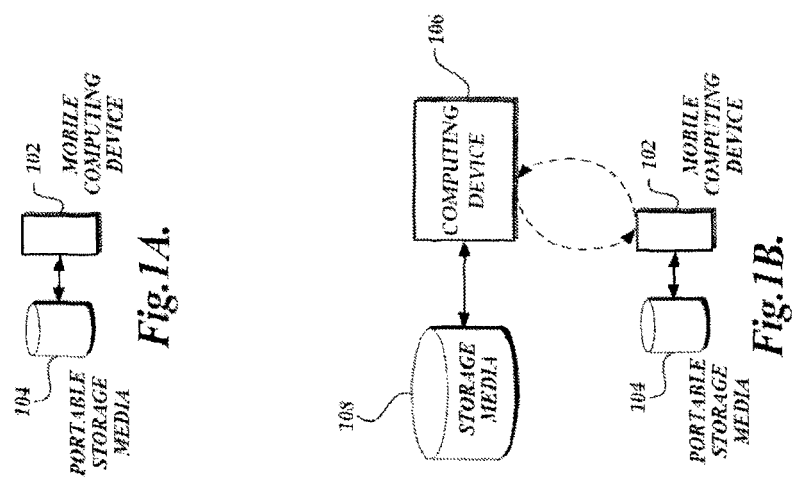
*Fig.1A.*
*Fig.1B.*

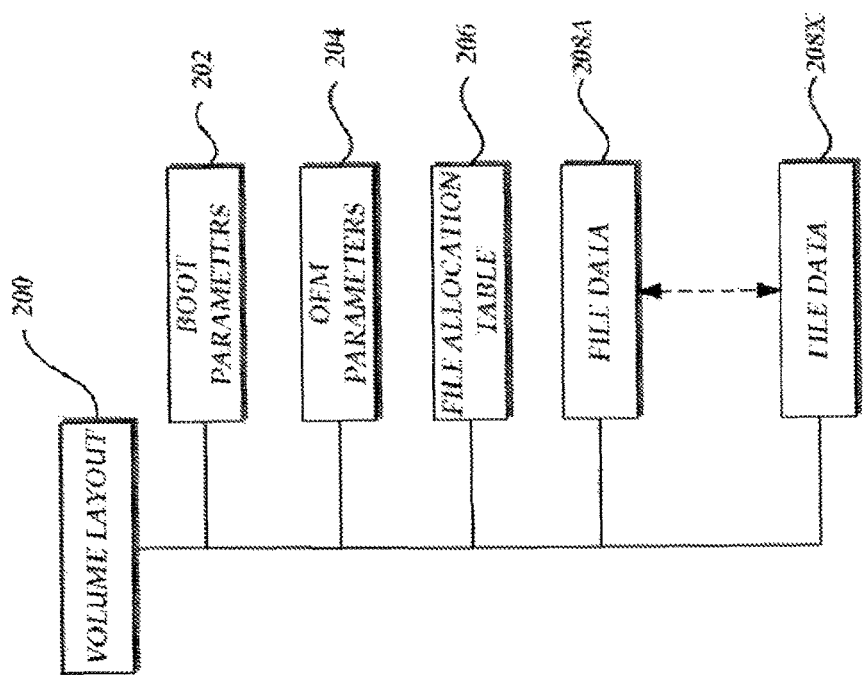

Fig. 4.

| NAME | SIZE |
|---|---|
| OEM NAME | 3 |
| DATA SIZE DESCRIPTORS | X |
| ACTIVE FAT | 2 |
| VOLUME SERIAL NUMBER | 4 |
| FILE SYSTEM TYPE | X |

| NAME | SIZE |
|---|---|
| IN USE | 1:1 |
| TYPE | 1:7 |
| SECONDARY ENTRIES | 1 |
| ATTRIBUTES | 2 |
| TIME | X |
| TIME ZONE | 1 |

| NAME | SIZE |
|---|---|
| IN USE | 1:1 |
| TYPE | 1:7 |
| CHARACTERS | 1 |
| NAME HASH | 2 |
| FILE NAME | 28 |

| NAME | SIZE |
|---|---|
| IN USE | 1:1 |
| TYPE | 1:7 |
| SECONDARY ENTRIES | 1 |
| GUID | 16 |

| NAME | SIZE |
|---|---|
| IN USE | 1:1 |
| TYPE | 1:7 |
| GUID | 16 |
| ALLOCATION FLAG | 1 |
| OTHER | x |

900 NAME / 902 IN USE / 904 TYPE / 906 GUID / 910 ALLOCATION FLAG / 912 OTHER

Fig. 10.

| NAME | SIZE |
|---|---|
| IN USE | 1:1 |
| TYPE | 1:7 |
| ACL INFORMATION | x |

1000 NAME / 1002 IN USE / 1004 TYPE / 1006 ACL INFORMATION

Fig. 8.

| NAME | SIZE |
|---|---|
| IN USE | 1:1 |
| TYPE | 1:7 |
| SECONDARY ENTRIES | 1 |
| GUID | 16 |
| ALLOCATION FLAG | 1 |
| OTHER | x |

800 NAME / 802 IN USE / 804 TYPE / 806 SECONDARY ENTRIES / 808 GUID / 810 ALLOCATION FLAG / 812 OTHER

CONTIGUOUS FILE ALLOCATION IN AN EXTENSIBLE FILE SYSTEM

CROSS-REFERENCE TO RELATED APPLICATIONS

This application is a continuation of U.S. patent application Ser. No. 14/099,307, filed on Dec. 6, 2013, which is a divisional of U.S. patent application Ser. No. 12/389,391, entitled CONTIGUOUS FILE ALLOCATION IN AN EXTENSIBLE FILE SYSTEM filed Feb. 20, 2009, which: (i) claims the benefit of U.S. Provisional Application No. 61/030,043 entitled FILE ALLOCATION TABLE; (ii) is a Continuation-In-Part of U.S. application Ser. No. 11/229,485 entitled EXTENSIBLE FILE SYSTEM filed Sep. 16, 2005 which claims the benefit of U.S. Provisional Application No. 60/637,407; and (iii) is also a Continuation-In-Part of U.S. application Ser. No. 11/752,872 entitled EXTENDING CLUSTER ALLOCATIONS IN AN EXTENSIBLE FILE SYSTEM filed May 23, 2007 which claims the benefit of U.S. Provisional Application No. 60/802,922; the contents of U.S. application Ser. Nos. 11/229,485, 11/752,872, 12/389,391 and U.S. Provisional Application Nos. 61/030,043 are incorporated by reference herein in their entireties.

BACKGROUND

Generally described, there are a number of portable computing devices, such as digital still cameras, digital video cameras, media players, mobile phones, mobile computing devices, personal digital assistants, and the like that maintain data on a storage media, such as a portable storage media. The continued development of more complex portable computing devices and larger storage capacity portable storage media places a greater demand for flexibility on the file system format used on the storage media. Current file system format approaches can become deficient in that they may provide adequate flexibility for increasing storage size capacities and/or storage media applications.

SUMMARY

An extensible file system format for portable storage media is provided. The extensible file system format includes the specification of primary and secondary directory entry types that may be custom defined. The primary and secondary directory entry types can be further classified as critical and benign directory entries.

In the confines of the extensible file system format a method for creating and reading a file in a contiguous format is provided. During the creation and/or modification of a file on the storage media, the file system format checks the free space bitmap to determine if there are areas of free space on the media that would permit the storage of the file in a contiguous manner. By storing the file in a contiguous manner the file may later be read without resorting to the file allocation table, because the file itself would not be fragmented on the storage media. Once an area of free space has been identified, the file is written to the media in a contiguous manner. Further, an associated entry for the file in the directory entry is updated or created to indicate that the file is a contiguous file and also provides basic parameters necessary to read the file without resorting to accessing the file allocation table.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIGS. 1A-1C are block diagrams illustrative of an illustrative environment including a portable computing device and a storage device implementing the extensible file system format in accordance with an aspect of the present invention;

FIG. 2 is a block diagram illustrative of various volume layout components corresponding to an extensible file system format in accordance with an aspect of the present invention;

FIG. 4 is a block diagram illustrative of data components for implementing a boot process block in an extensible file system format in accordance with an aspect of the present invention;

FIG. 5 is a block diagram illustrative of data components for implementing directory entries in an extensible file system format in accordance with an aspect of the present invention FIG. 6 is a block diagram illustrative of data components for implementing a file name and extensions in an extensible file system format in accordance with an aspect of the present invention;

FIG. 7 is a block diagram illustrative of data components for implementing a volume identifier in an extensible file system format in accordance with an aspect of the present invention;

FIG. 8 is a block diagram illustrative of data components for implementing an extensible directory entry in an extensible file system format in accordance with an aspect of the present invention;

FIG. 9 is a block diagram illustrative of data components for implementing an extensible directory entry in an extensible file system format in accordance with an aspect of the present invention;

FIG. 10 is a block diagram illustrative of data components for implementing an access control list in an extensible file system format in accordance with an aspect of the present invention.

DETAILED DESCRIPTION

Figure 3:
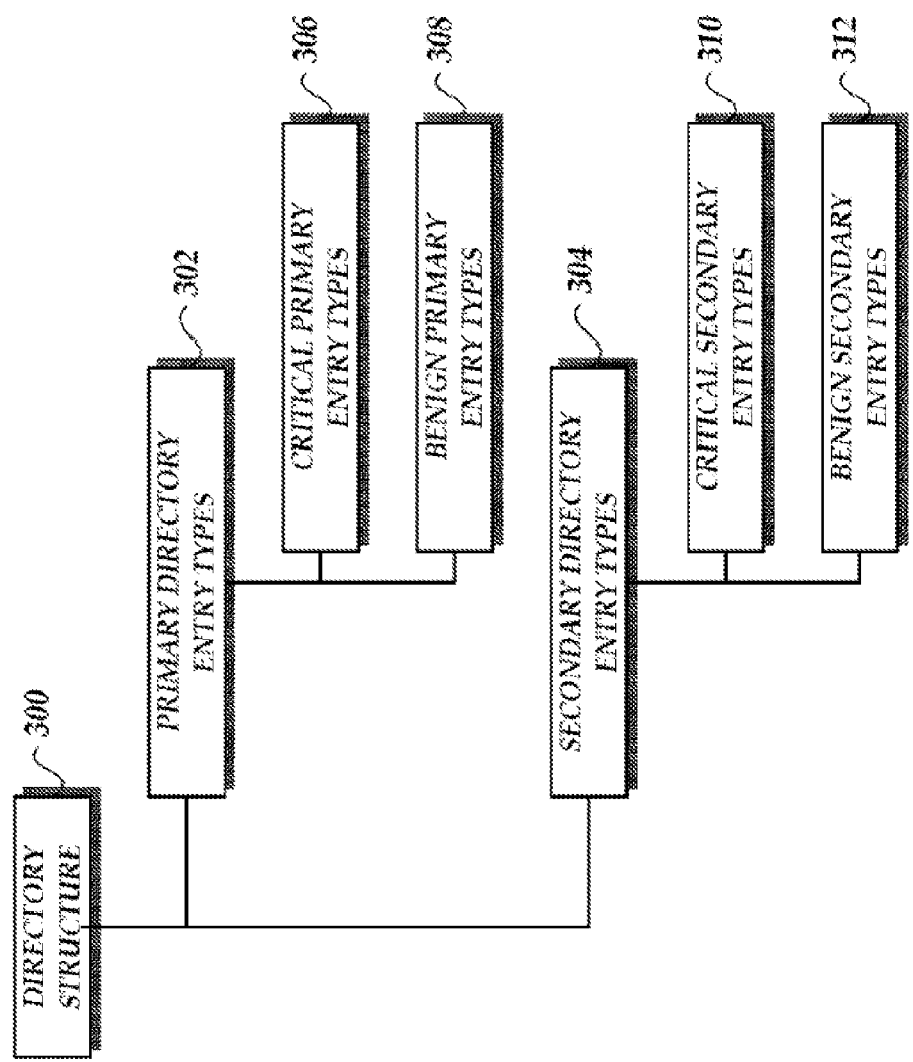
FIG. 3 is a block diagram illustrative of an extensible file system directory structures including primary and secondary directory entry structures in accordance with an aspect of the present invention.

Generally described, the present invention relates to an extensible file system format and various processes associated with the extensible file system format. In an illustrative embodiment, the extensible file system format corresponds to an extensible file system format for portable storage media and various processes associated with the extensible file system format on the portable storage media. Although the present invention will be described with regard to a portable storage media file system format, one skilled in the relevant art will appreciate that the disclosed embodiments are illustrative in nature and should not be construed as limiting. Additionally, one skilled in the relevant art will appreciate that the data structures and data layouts used in the illustrative examples may require additional information related to performance, security, and the like.

FIGS. 1A-1C are block diagrams illustrative of various operating environments 100 for the extensible file system format of the present invention. With reference to FIG. 1A, in an illustrative embodiment, the extensible file system format is utilized to store data from a computing device, such as a mobile computing device 102, and a storage media, such as a portable storage media 104. In an illustrative embodiment, the mobile computing device 102 can correspond to any one of a variety of computing devices, including but not limited to, portable computing devices, mobile telephones, personal digital assistants, music players, media players. The portable storage media can also include, but is not limited to, hard drives, flash media, micro-drives and other storage media. In an illustrative embodiment, the extensible file system on the portable storage media 104 does not have to include any type of executable or readable software components, such as an operating environment, utilized by the mobile computing device 102. Alternatively, the extensible file system on the portable storage media 104 may include executable or readable software components used by the mobile device 102.

In an illustrative embodiment, the mobile computing device 102 may be in communication with other computing devices for collecting/exchanging data to be stored on the portable storage media 104. With reference to FIG. 1B, the mobile computing device 102 may be in direct communication with another computing device 106 and storage media 108. In an illustrative embodiment, the direct communication can correspond to various wired and wireless communication methods. In an illustrative embodiment, the other storage media 108 is not required to be formatted in accordance with the extensible file system format of the present invention. With reference to FIG. 1C, in a similar manner, the mobile computing device 102 may also be in communication with another computing device 110 and storage media 112, via a network connection. In an illustrative embodiment, the network connection can correspond to local area network (LAN) and wide area network (WAN) connections.

With reference now to FIG. 2, an illustrative embodiment volume layout 200 for an extensible file system format will be described. The volume layout 200 includes a boot parameters component 202 that include various information related to a description of the file system parameters of the partition. In an illustrative embodiment, the boot parameters component 202 can include code for bootstrapping from a defined partition, fundamental file system parameters for the defined partition, and various error checking information. A data structure for defining at least a portion of the boot parameters will be described below with regard to FIG. 4.

The volume layout 200 also includes an extensible parameters component, designated as OEM parameters 204, that define various additional data structures used in conjunction with the file system. In an illustrative embodiment, an original equipment manufacture (OEM) may specify various extensible data structures, such as performance parameters for a storage medium, that can be defined at time of manufacture. The volume layout 200 can further include a file allocation table component 206 that defines file and directory allocations. In an illustrative embodiment, each entry in the file allocation table component 206 corresponds to a 32 bit entry that represents an allocated cluster, an unallocated cluster or an unusable cluster. The volume layout 200 can still further include series of file data components 208A-208X that correspond to the data stored according to the file system format. Various data structures for defining a portion of the file data components 208A-208X will be defined with regard to FIGS. 3-10.

Turning now to FIG. 3, in one aspect, the file data components 208 may include one or more directory entries according to a directory structure 300. In an illustrative embodiment, directory structure 300 is organized into primary directory entries 302 and secondary directory entries 304. Each directory entry in the primary and secondary entries is typed. For example, in an illustrative embodiment, type values for the primary and secondary directory entries can correspond to a range of 1 255. Primary directory entries 302 correspond to the entries in the root directory of the file system. Secondary directory entries 304 follow a primary directory entry and are associated with the primary directory entry. Secondary directory entries extend the metadata associated with the correlated primary directory entry.

With continued reference to FIG. 3, in an illustrative embodiment, the primary directory entries 302 can be further classified as critical primary directory entries 306 and benign primary directory entries 308. Critical primary directory entries 306 define potentially different formats for each directory entry. In an illustrative embodiment, an operating environment will not mount a volume corresponding to the extensible file system format with an unknown critical primary directory entry, as will be described below. Examples of known primary directory entries 306 can include allocation bitmaps, up case tables, volume labels, encryption keys, and normal directory entries. The allocation bitmap of the exFAT volume of the present embodiments maintains a record of the allocation states of all clusters on the storage media. This is a significant departure from the structure of other FAT systems (e.g. FAT 12, FAT 16, and FAT 32), in which a FAT maintained a record of the allocation state of all clusters in the cluster heap. Each bit in the allocation bitmap indicates whether its corresponding cluster is available for allocation or not. The clusters in the bitmap may be represented from lowest to highest index. In order to keep simplicity and to enable implementations on devices with limited memory and processor capacity, the file directory structure has been kept unsorted and "flat". The exFAT embodiments also enable many files (e.g., up to 2,796,202) in a single directory. In order to find if a target file name exists in a "flat" unsorted directory structure (for example, to create, open, update, or delete a file with that name), a comparison of the target file name can be done against the directory structure's relevant. Directory entries instead of going to the FAT table.

Benign primary directory entries 308 also define potential different formats for each directory entry, but can be ignored by the file system if a particular benign primary directory entry is not understood. Benign primary directory entries 308 can be associated with another cluster chain of the volume. Additionally, benign primary directory entries 308 can also be associated a number of secondary directory entries 304.

In a manner similar to primary directory entries 302, secondary directory entries 304 may also be further classified as critical secondary directory entries 310 and benign secondary directory entries 312. As described above, the critical secondary directory entries 310 and benign secondary directory entries 312 are associated with a benign primary directory entry and extend the metadata associated with the primary directory entry. Both the critical secondary directory entries 310 and the benign secondary directory entries 312 can be associated with another cluster chain of the volume.

To mount a corresponding to the extensible file system format, the file system implements a mount volume procedure. In an illustrative embodiment, the mount volume procedure attempts to a look at a version number for the volume. If the version number is not understood (e.g., the version number is higher), the volume will not be mounted. During a normal directory enumeration, any critical primary directory entries not known by the file system will prevent the volume from being mounted. Thereafter, various user initiated processes, such as a file open, will cause the file system to enumerate the secondary directory entries. If the critical secondary directory entries 310 are not known by a file system, the entire directory entry will be skipped. Additionally, if benign secondary directory entries 312 are not known by the file system, the particular unknown benign secondary directory entry will be ignored.

With reference now to FIG. 4, a block diagram illustrative of data components 400 for implementing a boot process block in the boot parameters component 202 (FIG. 2) will be described. The data components 400 include an OEM name component 402 for specifying a name for the file system format of the storage media. The data components 400 also include a data size descriptor component 404 for specifying various characteristics of the data stored in the file system. For example, the data size descriptor component 404 can specify a count of bytes per sector, a number of sectors per allocation unit, a FAT table offset, and a count of sectors for all data structures. The data components include an active FAT flags component 406 for specifying a number of active FATs on the file system. In an illustrative embodiment, a file system may support multiple FATs for utilization with some operating system environments. The data components 400 can further include a volume identification component 408 for identifying a volume serial number and/or version number. Still further, the data components 400 can include a file system type for specifying the file system format for the file system. One skilled in the relevant art will appreciate that the data components 400 can include a number of additional/alternative rows for implementing the above identified components 402 410 and additional components.

Turning now to FIG. 5, a block diagram illustrative of data components 500 for implementing directory entries in an extensible file system format will be described. The data components 500 include an in use component 502 for specifying whether the particular directory entry is in use. In an illustrative embodiment, the high bit of the data components will be set to "1" if the directory entry is in use. The data components 500 further include a type designation component 504 for specifying that the directory entry is associated with a normal directory entry. The data components 500 further include a secondary directory entries component 506 for specifying a number of secondary entries associated with the normal directory entry. The data components 500 also include a file attributes component 508 for specifying various file system attributes for the directory entry. Still further, the data components 500 include a time component 510 for specifying various time information such as a creation timestamp, modification time stamp and other time information. Additionally, the data components 500 further include a time zone component 512 for specifying a time zone for the last created time stamp. One skilled in the relevant art will appreciate that the data components 500 can include a number of additional/alternative rows for implementing the above identified components 502 512 and additional components.

Turning now to FIG. 6, a block diagram data components 600 for implementing a file name and extensions will be described. The data components 600 include an in use component 602 for specifying whether the particular directory entry is in use. In an illustrative embodiment, the high bit of the data components will be set to "1" if the directory entry is in use. The data components 600 further include a type designation component 604 for specifying that the directory entry is associated with a file system name. The data components further include a file name length component 606 and a file name has component 608. The utilization of the file name hash component 608 will be described below. The data components 600 also include a file name component 610 for specifying the file name. One skilled in the relevant art will appreciate that the data components 600 can include a number of additional/alternative rows for implementing the above identified components 602 610 and additional components. Additionally, file name directory entries may be extended by secondary directory entries.

Turning now to FIG. 7, a block diagram illustrative of data components 700 for implementing a volume identifier in an extensible file system format is provided. The data components 700 include an in use component 702 for specifying whether the particular directory entry is in use. In an illustrative embodiment, the high bit of the data components will be set to "1" if the directory entry is in use. The data components 700 further include a type designation component 704 for specifying that the directory entry is associated with a volume identifier. The data components 700 further include a secondary directory entries component 706 for specifying a number of secondary entries associated with the volume identifier. The data components 700 also include a volume identifier 708, such as a global unique identifier. One skilled in the relevant art will appreciate that the data components 700 can include a number of additional/ alternative rows for implementing the above identified components 702-708 and additional components. Additionally, in an illustrative embodiment, the data components 700 correspond to a benign directory entry that can be ignored by a file system that does not support volume identifiers.

With reference now to FIGS. 8 and 9, in an illustrative embodiment, parties, such as an OEM, may be able to define specific benign primary directory entry types 308 and benign secondary directory entry types 312. As discussed above, in the event the file system would not recognize or understand either the specific benign primary directory entry types 308 or benign secondary directory entry types 312, the file system could ignore the defined directory entry types.

With reference to FIG. 8, a block diagram illustrative of data components 800 for implementing an extensible benign primary directory entry 308 in an extensible file system format will be described. The data components 800 include an in use component 802 for specifying whether the particular directory entry is in use. In an illustrative embodiment, the high bit of the data components will be set to "1" if the directory entry is in use. The data components 800 further include a type designation component 804 for specifying that the directory entry is a benign primary directory entry. The data components 800 further include a secondary directory entries component 806 for specifying a number of secondary entries associated with the volume identifier. The data components 800 also include a volume identifier 808, such as a global unique identifier. The data components 800 can further include a flag component 810 that corresponds to an indication of whether contiguous allocation of a cluster chain is to be implemented. The data components 800 can further include additional information 812, such as verification information and a starting cluster. As will be explained in greater detail below, cluster chains utilizing contiguous allocation can be defined according to cluster chain size and a starting cluster for the first cluster in the chain. One skilled in the relevant art will appreciate that the data components 800 can include a number of additional/alternative rows for implementing the above identified components 802-812 and additional components.

With reference to FIG. 9, a block diagram illustrative of data components 900 for implementing a benign secondary directory entry in an extensible file system format will be described. The data components 900 include an in use component 902 for specifying whether the particular directory entry is in use. In an illustrative embodiment, the high bit of the data components will be set to "1" if the directory entry is in use. The data components 900 further include a type designation component 904 for specifying that the directory entry is a benign primary directory entry. The data components 900 further include a secondary directory entries component 906 for specifying a number of secondary entries associated with the volume identifier. The data components 900 also include a volume identifier 908, such as a global unique identifier. The data components 900 can further include a flag component 910 that corresponds to an indication of whether contiguous allocation of a cluster chain is to be implemented. The data components 900 can further include additional information 912, such as verification information and a starting cluster. One skilled in the relevant art will appreciate that the data components 900 can include a number of additional/alternative rows for implementing the above identified components 902-912 and additional components.

In an illustrative embodiment, a benign primary directory entry and/or secondary directory entries may be associated with access control list (ACL) information. FIG. 10 is a block diagram illustrative of data components 1000 for implementing an access control list in an extensible file system format. The data components 1000 include an in use component 1002 for specifying whether the particular directory entry is in use. In an illustrative embodiment, the high bit of the data components will be set to "1" if the directory entry is in use. The data components 1000 further include a type designation component 1004 for specifying that the directory entry is an ACL directory entry. The data components 1000 further include a number of ACL fields 1006, such as ACL flags, pointers to ACL databases, and the like. One skilled in the relevant art will appreciate that the data components 1000 can include a number of additional/alternative rows for implementing the above identified components 1002 1006 and additional components.

Figure 11:
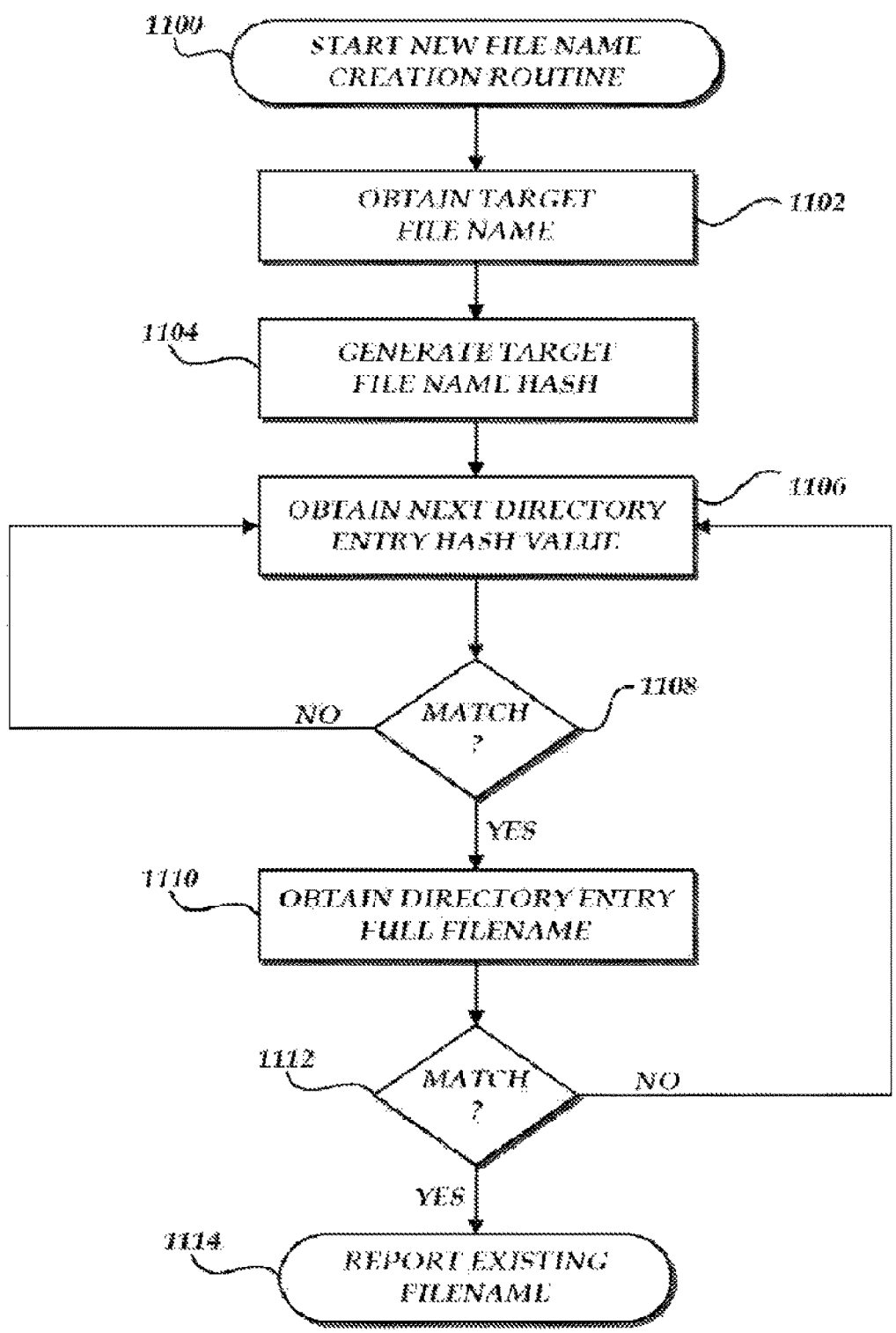
FIG. 11 is a flow diagram illustrative of a file name creation routine for an extensible file system format in accordance with an aspect of the present invention.

With reference now to FIG. 11, a file name creation routine 1100 for an extensible file system format will be described. At block 1102, a file system obtains a request to create a directory entry with a specific file name. In an illustrative embodiment, the specific file name can correspond to a naming convention, such as a digital camera picture naming convention. At block 1104, the file system generates a target name hash. At block 1106, an iterative loop is begun by examining the next directory entry hash value. An illustrative directory entry type for storing directory entry hash values is described above with regard to data components 600 (FIG. 6).

At decision block 1108, a test is conducted to determine whether the target hash value matches the current directory entry hash value. If they do not match, the routine 1100 returns to block 1106 (until all the directory entries have been examined. If the hash values match at decision block 1108, at block 1110, the file system obtains the full file name for the potentially matching directory entry. An illustrative directory entry type for storing directory entry full file names is described above with regard to data components 600 (FIG. 6). At decision block 1112, a test is conducted to determine whether the target file name matches the full file name of the potentially matching directory entry. If so, the routine 1100 terminates by reporting a conflict and the file system will be required to select a new file name. If the full file does not match, the routine 1100 will return to block 1106 to continue checking hash values for all the directory entries in the file system.

In accordance with an aspect of the present invention, various additional functionality may be added through the specification of specific directory types. For example, name streams may be supported by specifying a name stream directory entry. Additionally, on disk encryption may also be supported through the utilization of specific encryption algorithms and key exchanges. Still further, time zone conversions may be associated with directory entries to automatically convert a current time zone with a time zone with the directory entry was made.

Figure 12:
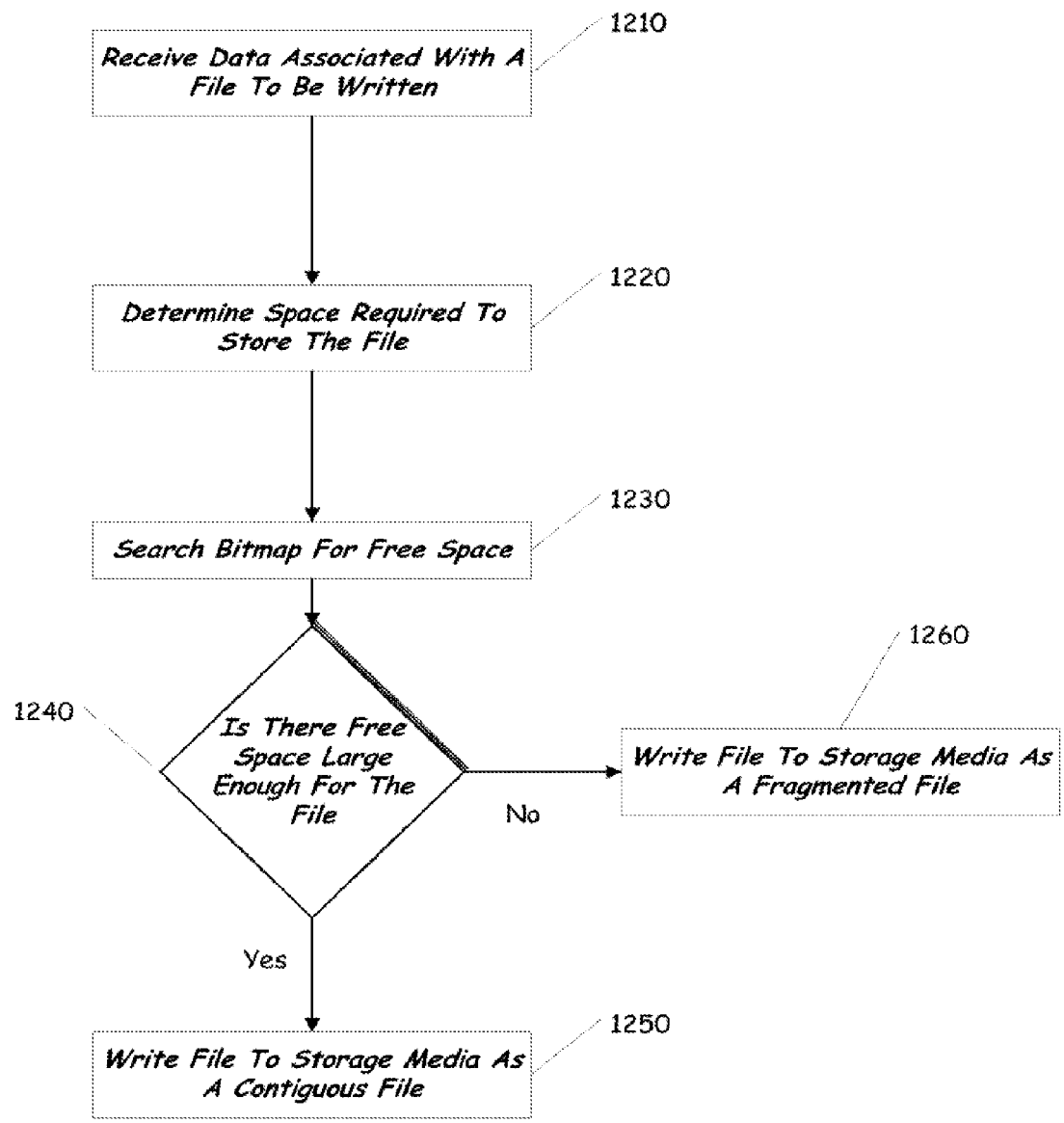
FIG. 12 is a flow diagram illustrating the creation and updating of a file as a contiguous file according to one illustrative embodiment.

FIG. 12 is a flow diagram illustrating a process for creating or allocating a file as a contiguous file in the extensible file system format, according to at least one embodiment. Contiguous files are files that are stored on the storage media in such a manner that they are not fragmented by clusters in between clusters that store the data for the file. The process of FIG. 12 will be discussed in general terms and is applicable to any type of file that may be stored on the storage media.

To start the creation process, data associated with the file to be stored is received at the storage media. This file data can be any type of file and may have originated at any source. For example, the data may be a document, a photograph, a music file, a media file, or any other type of data file that may be stored. Further, the file may have originated or been generated at a personal computer, a camera, a digital media player, or any other consumer electronics device. The receipt of this data is illustrated at step 1210.

Once the data has been received at the storage media, the amount of space needed to store the file is determined. This is illustrated at step 1220. Depending on the configuration of the storage media and the device providing the data, the determined amount of space may be described as in the number of clusters needed or the actual size in bytes of the file. The process of FIG. 12 also scans the bitmap associated with the storage media to identify free space on the storage media. This is illustrated at 1230. The free space on the storage media is unused space that the storage media has allocated for storage of files and other data.

Once the available free space on the storage media has been identified, the process of FIG. 12 determines if there is a section or area of free space on the storage media that is the same size or is larger than the size of the file to be stored. For example, that is large enough to contain the entire file to be stored. This identification of the size of the free space is used to determine if the file can be stored as a contiguous file. The identification of the free space is illustrated at 1240.

If there is an area of free space on the storage media that is the same size or larger than the size of the file, then the file is written to the storage media as a contiguous file. This is illustrated at 1250. In contrast to typical methods of writing a file to a storage media, the process of writing a contiguous file avoids writing any information to the File Allocation Table. At step 1250, an entry in the directory entry for the file is created and the file size (either in bytes or clusters) and starting cluster are placed in the directory entry for the file. The directory entry can be either the primary or secondary directory entry discussed earlier. Additionally, a bit in the directory entry is set to indicate that the file is a contiguous file. This information stored in the directory entry allows for faster reading of the file and will be discussed in greater detail with respect to FIG. 13. When enough free space cannot be found at step 1240, then the file is written to the storage media as a fragmented file using the File Allocation Table, as shown at step 1260.

The process of FIG. 12 can also be used when the file has previously been stored on the storage media. In this embodiment the stored file is updated by a device that is configured to modify the file. The modification of the file can either cause the file to become larger, such as when a user adds data to the file, or become smaller, such as when the user removes data or compresses the file. Depending on the nature of the update (enlarging or shrinking the size of the file) slightly different processes are performed at the steps of FIG. 12.

In the situation where the file is updated to be a larger file the process of FIG. 12 first determines if there is enough free space left in the area of free space where the file is currently stored, to write the updated file. If there is enough free space in the area of free space contiguous to the previous allocation, the updated file is simply written to this area of free space. At this time the directory entry for the file is updated to reflect the change in the number of clusters and size of the file. If the area of free space is not large enough to store the updated file, the process of FIG. 12, in some embodiments, repeats step 1240 to attempt to identify if there is another area of free space that is large enough to write the updated file as a contiguous file. If another area of free space that is large enough for the updated file is identified, the updated file is written to the storage media in the other area of free space and the associated entries in the directory entry are updated.

However, when another sufficiently large area of free space cannot be located on the storage media, the file is stored on the storage media as any other non-contiguous file would be stored, as shown by step 1260. That is, the file is fragmented such that part of the file is stored in a first set of clusters and another part of the file is stored in a second set of clusters that is not contiguous with the first set. Further, the directory entry for the file is modified by deselecting the contiguous file bit so that the file is no longer indicated as being contiguous. As the file is written in a non-contiguous manner, the File Allocation Table is updated to include the information necessary to retrieve the file from the storage media.

In the situation where the updated file is smaller than the original file the process of FIG. 12 determines if the file is already a contiguous file. If the file is already contiguous the updated file is written in the current location and the associated entry in the directory entry is updated to reflect the new size of the file. However, if the original file is not a contiguous file, the process determines whether the updated file can be written in a contiguous manner. The process for determining if the file is to be written in a contiguous manner is executed according to steps 1210-1250 discussed above. However, at step 1240, the process considers the space currently occupied by the file as being free space.

Figure 13:
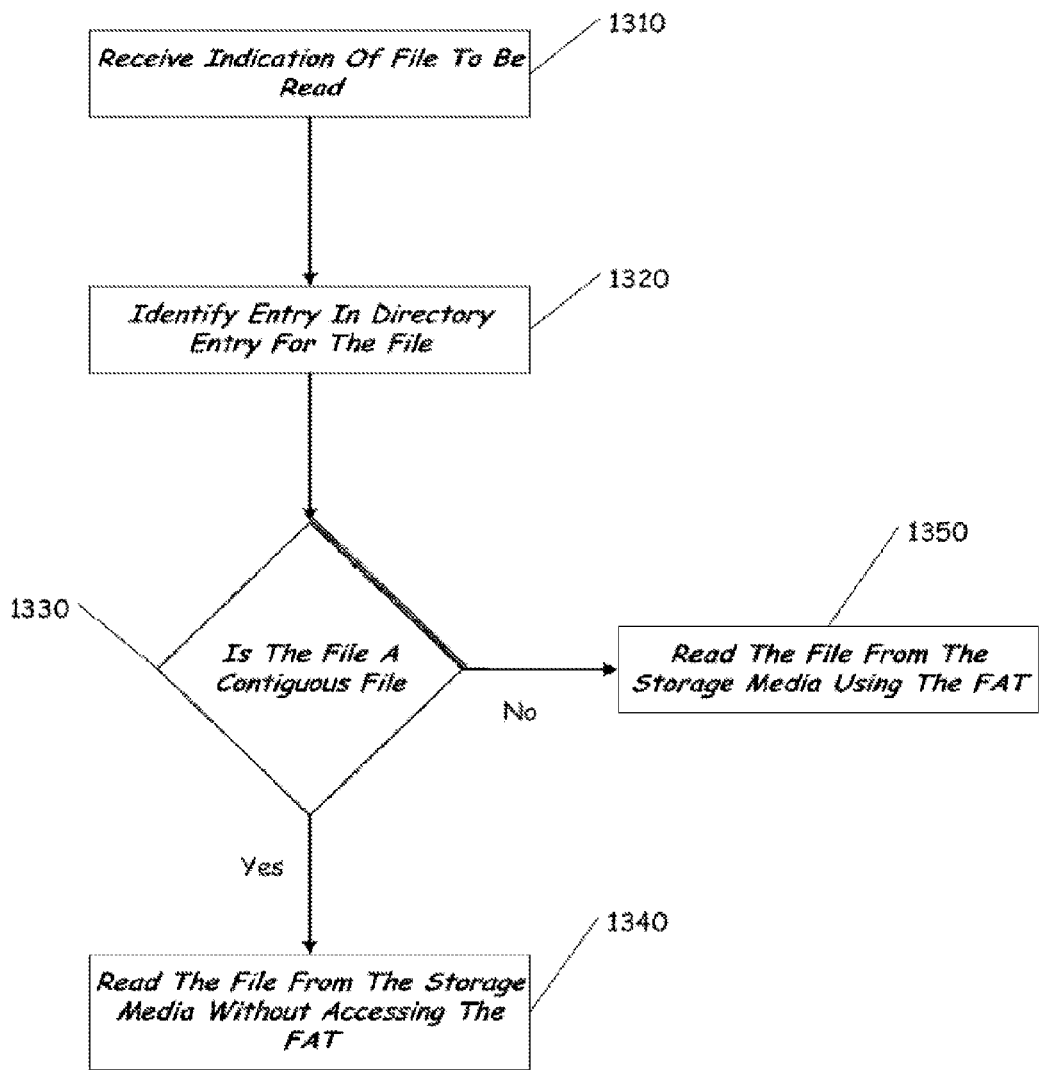
FIG. 13 is a flow diagram illustrating the reading of a file when the file is a contiguous file according to one illustrative embodiment.

FIG. 13 is a flow diagram illustrating a process for reading a contiguous file in the extensible file system format from the storage media, according to at least one embodiment. The process of FIG. 13 begins when the storage media receives an indication of the file that is to be read from the storage media. For example the indication can be the name of the file. This is illustrated at 1310. Next the process of FIG. 13 identifies an entry in the directory entry for the indicated file. This is illustrated at 1320. Once an entry in the directory entry is located, the process then determines if the file is a contiguous file. This is illustrated at 1330. If the entry is not identified as contiguous the process reads the file in a conventional manner using the FAT table, as shown at step 1350. In one embodiment the process determines if a contiguous file flag or bit is set in the directory entry for the file. If the file is determined to be a contiguous file the file is read from the storage media without accessing the File Allocation Table. This is illustrated at 1340. In one embodiment the process reads the file without using the File Allocation Table, by obtaining the starting cluster location for the file from the directory entry. The process also determines the number of clusters used by the file from the directory entry. If the entry for the filed does not contain the number of clusters, the process can calculate the number of clusters by dividing the file size obtained from the directory entry by a known cluster size for the storage media. Then the process obtains the entire file by reading from the bitmap from the starting cluster that number of clusters indicated by the directory entry.

Figure 14:
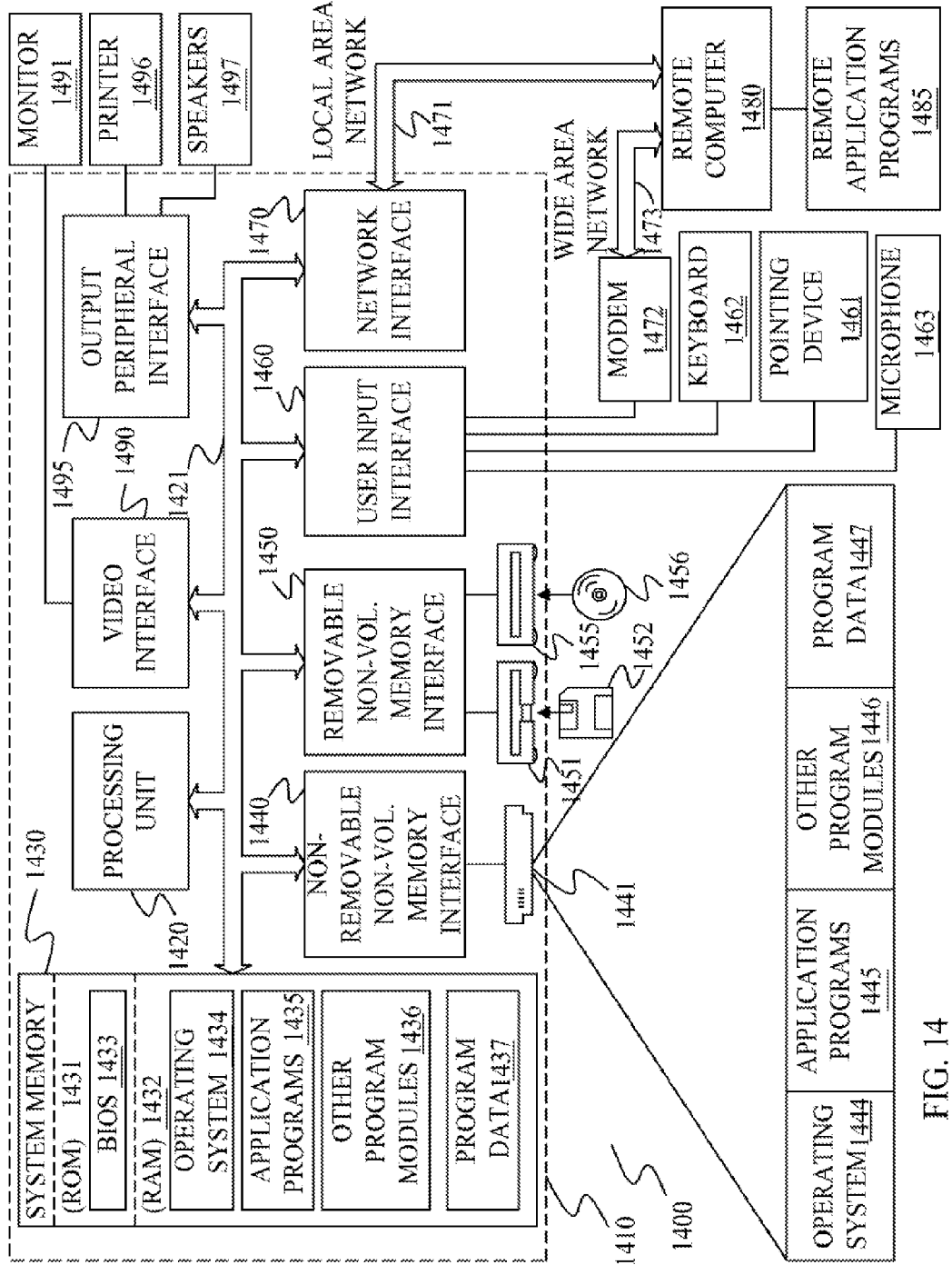
FIG. 14 is a general block diagram of a computing system in which embodiments of the present file system format may be practiced.

FIG. 14 illustrates an example of a suitable computing system environment 1400 on which the extensible file system format of the present discussion may be implemented. The computing system environment 1400 is only one example of a suitable computing environment and is not intended to suggest any limitation as to the scope of use or functionality. Neither should the computing environment 1400 be interpreted as having any dependency or requirement relating to any one or combination of components illustrated in the exemplary operating environment 1400.

The extensible file system format is operational with numerous other general purpose or special purpose computing system environments or configurations. Examples of well-known computing systems, environments, and/or configurations that may be suitable for use with the extensible file system format include, but are not limited to, personal computers, server computers, hand-held or laptop devices (such as mobile phones, media players, etc.), multiprocessor systems, microprocessor-based systems, set top boxes, media kiosks, consumer electronics (such as televisions, optical disk players, digital picture frames, etc.), network PCs, minicomputers, mainframe computers, telephony systems, distributed computing environments that include any of the above systems or devices, and the like.

With reference to FIG. 14, an exemplary system for implementing the extensible file system format includes a general-purpose computing device in the form of a computer 1410. Components of computer 1410 may include, but are not limited to, a processing unit 1420, a system memory 1430, and a system bus 1421 that couples various system components including the system memory to the processing unit 1420. The system bus 1421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 1410 typically includes a variety of computer readable media. Computer readable media can be any available media that can be accessed by computer 1410 and includes both volatile and nonvolatile media, removable and non-removable media. By way of example, and not limitation, computer readable media may comprise computer storage media and communication media. Computer readable storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 1410. Combinations of any of the above should also be included within the scope of computer readable media.

The system memory 1430 includes computer storage media in the form of volatile and/or nonvolatile memory such as read only memory (ROM) 1431 and random access memory (RAM) 1432. A basic input/output system 1433 (BIOS), containing the basic routines that help to transfer information between elements within computer 1410, such as during start-up, is typically stored in ROM 1431. RAM 1432 typically contains data and/or program modules that are immediately accessible to and/or presently being operated on by processing unit 1420. By way of example, and not limitation, FIG. 14 illustrates operating system 1434, application programs 1435, other program modules 1436, and program data 1437.

The computer 1410 may also include other removable/non-removable volatile/nonvolatile computer storage media. By way of example only, FIG. 14 illustrates a hard disk drive 1441 that reads from or writes to non-removable, nonvolatile magnetic media, a magnetic disk drive 1451 that reads from or writes to a removable, nonvolatile magnetic disk 1452, and an optical disk drive 1455 that reads from or writes to a removable, nonvolatile optical disk 1456 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1441 is typically connected to the system bus 1421 through a non-removable memory interface such as interface 1440, and magnetic disk drive 1451 and optical disk drive 1455 are typically connected to the system bus 1421 by a removable memory interface, such as interface 1450.

The drives and their associated computer storage media discussed above and illustrated in FIG. 14, provide storage of computer readable instructions, data structures, program modules and other data for the computer 1410. In FIG. 14, for example, hard disk drive 1441 is illustrated as storing operating system 1444, application programs 1445, other program modules 1446, and program data 1447. Note that these components can either be the same as or different from operating system 1434, application programs 1435, other program modules 1436, and program data 1437. Operating system 1444, application programs 1445, other program modules 1446, and program data 1447 are given different numbers here to illustrate that, at a minimum, they are different copies. In some embodiments, at least a portion of processes described above may be implemented by computer readable instructions executable by one or more computing devices.

A user may enter commands and information into the computer 1410 through input devices such as a keyboard 1462, a microphone 1463, and a pointing device 1461, such as a mouse, trackball or touch pad. Other input devices (not shown) may include a joystick, game pad, satellite dish, scanner, or the like. These and other input devices are often connected to the processing unit 1420 through a user input interface 1460 that is coupled to the system bus, but may be connected by other interface and bus structures, such as a parallel port, game port or a universal serial bus (USB). A monitor 1491 or other type of display device is also connected to the system bus 1421 via an interface, such as a video interface 1490. In addition to the monitor, computers may also include other peripheral output devices such as speakers 1497 and printer 1496, which may be connected through an output peripheral interface 1490.

The computer 1410 may operate in a networked environment using logical connections to one or more remote computers, such as a remote computer 1480. The remote computer 1480 may be a personal computer, a hand-held device, a server, a router, a network PC, a peer device or other common network node, and typically includes many or all of the elements described above relative to the computer 1410. The logical connections depicted in FIG. 14 include a local area network (LAN) 1471 and a wide area network (WAN) 1473, but may also include other networks. Such networking environments are commonplace in offices, enterprise-wide computer networks, intranets and the Internet.

When used in a LAN networking environment, the computer 1410 is connected to the LAN 1471 through a network interface or adapter 1470. When used in a WAN networking environment, the computer 1410 typically includes a modem 1472 or other means for establishing communications over the WAN 1473, such as the Internet. The modem 1472, which may be internal or external, may be connected to the system bus 1421 via the user input interface 1460, or other appropriate mechanism. In a networked environment, program modules depicted relative to the computer 1410, or portions thereof, may be stored in the remote memory storage device. By way of example, and not limitation, FIG. 14 illustrates remote application programs 1485 as residing on remote computer 1480. It will be appreciated that the network connections shown are exemplary and other means of establishing a communications link between the computers may be used.

While illustrative embodiments have been illustrated and described, it will be appreciated that various changes can be made therein without departing from the spirit and scope of the invention.

What is claimed is:
1. A computing device comprising:
 a non-transitory computer readable storage medium that stores information within a volume on the non-transitory computer readable storage medium, the volume comprising:

a plurality of directory entries, each of the plurality of directory entries containing information designating the directory entry as either a primary directory entry or a secondary directory entry, each secondary directory entry being associated with a primary directory entry, and each of the primary and secondary directory entries being typed and including a type designation that identifies the type of the directory entry, at least some of the primary and secondary directory entries being associated with a respective file stored on the volume and containing a flag that indicates whether or not data of the respective file is stored in one or more contiguous clusters on the volume; and a file system, the file system:

storing on the storage medium information defining a file allocation table associated with the file system;

storing the data of a file in one or more contiguous clusters on the storage medium;

storing on the storage medium at least one directory entry associated with the file;

setting a flag contained in said at least one directory entry to a value that indicates that the data of the file associated with that directory entry is stored in the one or more contiguous clusters;

storing as part of said at least one directory entry information specifying a starting cluster of the one or more contiguous clusters and information indicating a size of the one or more contiguous clusters;

receiving an indication that the file is to be read from the storage medium;

accessing the at least one directory entry that is associated with the file that is to be read;

determining from the flag contained in the at least one directory entry that the data of the file associated with that directory entry is stored in one or more contiguous clusters on the volume;

in response to determining from the flag that the data of the file associated with the at least one directory entry is stored in one or more contiguous clusters, identifying each cluster of the one or more contiguous clusters based on other information within the at least one directory entry and without traversing the file allocation table, the other information within the at least one directory entry comprising the information specifying the starting cluster of the one or more contiguous clusters and the information indicating the size of the one or more contiguous clusters; and reading the data of the file from the identified clusters.

2. The computing device recited in claim 1, the file system:

accessing a second directory entry stored on the storage medium, the second directory entry being associated with a different file stored on the storage medium;

determining from the flag contained in the second directory entry that data of the file associated with that second directory entry is not stored in one or more contiguous clusters on the volume; and identifying the data of the file associated with the second directory entry by traversing the file allocation table.

3. The computing device recited in claim 1, the information indicating a size of the one or more contiguous clusters comprising a value specifying a size of the file associated with the one directory entry.

4. The computing device recited in claim 1, each secondary directory entry extending metadata associated with the primary directory entry with which the secondary directory entry is associated.

5. The computing device recited in claim 1, the type designation comprising a type value that identifies the type of the directory entry.

6. The computing device recited in claim 1, the file allocation table storing, for any file that does not have its data stored in one or more contiguous clusters, an indication of the non-contiguous chain of clusters that store the data of that file.

7. In a computing device comprising a non-transitory computer readable storage medium that stores information within a volume on the computer readable storage medium, the volume comprising a plurality of directory entries, each of the plurality of directory entries containing information designating the directory entry as either a primary directory entry or a secondary directory entry, each secondary directory entry being associated with a primary directory entry, and each of the primary and secondary directory entries being typed and including a type designation that identifies the type of the directory entry, at least some of the primary and secondary directory entries being associated with a respective file stored on the volume and containing a flag that indicates whether or not data of the respective file is stored in one or more contiguous clusters on the volume, a method comprising:

storing on the storage medium information defining a file allocation table associated with the file system;

storing the data of a file in one or more contiguous clusters on the storage medium;

storing on the storage medium at least one directory entry associated with the file;

setting a flag contained in said at least one directory entry to a value that indicates that the data of the file associated with that directory entry is stored in the one or more contiguous clusters:

storing as part of said at least one directory entry information specifying a starting cluster of the one or more contiguous clusters and information indicating a size of the one or more contiguous clusters;

receiving an indication that the file is to be read from the storage medium;

accessing the at least one directory entry that is associated with the file that is to be read;

determining from the flag contained in the at least one directory entry that the data of the file associated with that directory entry is stored in one or more contiguous clusters on the volume;

in response to determining from the flag that the data of the file associated with the at least one directory entry is stored in one or more contiguous clusters, identifying each cluster of the one or more contiguous clusters based on other information within the at least one directory entry and without traversing the file allocation table, the other information within the at least one directory entry comprising the information specifying the starting cluster of the one or more contiguous clusters and the information indicating the size of the one or more contiguous clusters; and reading the data of the file from the identified clusters.

8. The method recited in claim 7, further comprising:

accessing a second directory entry stored on the storage medium, the second directory entry being associated with a different file stored on the storage medium;

determining from the flag contained in the second directory entry that data of a file associated with that second directory entry is not stored in one or more contiguous clusters on the volume; and identifying the data of the file associated with the second directory entry by traversing the file allocation table.

9. The method recited in claim 7, the information indicating a size of the one or more contiguous clusters comprising a value specifying a size of the file associated with the one directory entry.

10. The method recited in claim 7, each secondary directory entry extending metadata associated with the primary directory entry with which the secondary directory entry is associated.

11. The method recited in claim 7, the type designation comprising a type value that identifies the type of the directory entry.

12. The method recited in claim 7, further comprising storing in the file allocation table, for any file that does not have its data stored in one or more contiguous clusters, an indication of the non-contiguous chain of clusters that store the data of that file.

* * * * *